UNITED STATES PATENT OFFICE.

JOSÉ SERRA (Y CARBÓ), OF BARCELONA, SPAIN, ASSIGNOR TO HARVEY COALE, OF BALTIMORE, MARYLAND.

ARTIFICIAL CORK AND METHOD OF MAKING THE SAME.

No. 846,251.          Specification of Letters Patent.          Patented March 5, 1907.

Application filed April 17, 1906. Serial No. 312,260.

*To all whom it may concern:*

Be it known that I, JOSÉ SERRA (Y CARBÓ), a subject of the King of Spain, residing in Barcelona, Spain, have invented certain new and useful Improvements in Artificial Cork and Methods of Making the Same, of which the following is a specification.

By reason of the growing scarcity of the natural supply of cork and the increasing demands therefor it has long been sought to secure either a substitute material which would take its place or to provide for the utilization of a larger proportion of the natural material than is now found possible, due to the defects found in it resulting from the presence and propagation of insect life attacking the trees or from climatic or other conditions. So far as I am aware, no substitute material has ever been found to take the place of cork, as it is practically impossible to produce a composition having the peculiar characteristics of cork so indispensable in most, if not all, situations where cork is commonly used.

From one cause or another (as is well known in cork-producing countries) it happens that it is impossible to find among thousands of pieces of cork a piece of any considerable size which does not show defects of one kind or another. These defects develop during the long period of growth (about ten years) necessary to produce the cork in the best condition, and this explains the scarcity of fine cork and the fact that it is found in comparatively small pieces, it being necessary to divide out the portions of the fine cork from the defective material. This results in a great amount of waste as the industry is now carried on, and I have aimed to utilize all of this valuable cork material instead of taking from the raw material selected portions, thus reducing the cost of the finished product and at the same time taking advantage of the qualities of the cork by utilizing it as the body of my improved product.

My invention consists in reducing the cork to a finely-divided condition of granular form, treating the granules to separate them mechanically and chemically from the damaged or defective parts, and finally combining the granules by the use of a suitable binder and by pressure and heat into a convenient form for utilization as a perfect product, free from defect and interstices and practically non-porous.

I reduce the cork to a granular form by any suitable mechanical means, and in carrying out my invention I utilize not only the ordinary waste material, but very much of the material which ordinarily appears of too poor a quality to be utilized for any purpose. After the proper reduction of the cork to granular form I subject it to treatment, so as to remove the damaged or impure parts, accomplishing this by placing the cork-dust in water acidulated with sulfuric acid. After this treatment the cork granules may be collected and in a like manner subjected to other liquids suitable for bleaching the granules. After the cork granules have been purified and bleached I then mix with the granules a solution of albumen. The material is then put in molds and its bulk reduced by pressure, after which the molds are submitted to a temperature of about 212° Fahrenheit in a moist heat either by introducing it in boiling water or by subjecting it to a jet of steam in order to coagulate the albumen. After this has been completely accomplished the mold is opened, and in consequence of having retained within its pores the moisture due to the subjection of the mold to the moist heat the albumen forms a texture of a very fine fiber, thus acting as a most efficient binder, but resulting as well in producing a material of greater elasticity even than the natural cork and with none of the disadvantages of the natural material. The moist condition of the material permits it to be cut and manufactured as readily as the natural material.

As the binding material after coagulation is inodorous, tasteless, and insoluble, the new product obtained can be used for any of the purposes for which the natural cork is used and for many more, for the reason that it is practically non-porous and it presents a perfect material, and therefore it does not require classification and separation, as in the case of the natural product where a higher grade of cork is required for particular purposes. Further than this, the appearance of the product is improved as a whole, and it is pure cork with an insignificant addition of a binding material which becomes insoluble, and it shows no holes or interstices on its surface, remains always the same in its physical structure, and is brightened very easily, while I secure great economy of manufacture, for the reason that I am enabled to utilize such a large part of the cork material now thrown aside as waste.

It is of the utmost importance that the material be subjected to moist heat, as otherwise the product made under a high dry temperature will be found to be of a hard nature not suitable for the uses for which corks are intended. When the cork granules are dry and hard, as sometimes occurs when the cork material is inferior, I may use some substance to soften them—as, for instance, glycerin.

I claim—

1. As a new article of manufacture, an artificial cork consisting of a granular base and a liquid binding material mixed therewith and rendered insoluble therein by heat.

2. An artificial cork material consisting of a granular base of cork and a binding material which has been rendered insoluble therein by heat.

3. An artificial cork composed of finely-divided or granulated cork and a binding material composed of an albumenous substance; substantially as described.

4. The method of making artificial cork, consisting in taking granulated cork mixing therewith a soluble coagulable binding material and finally subjecting the material to heat to render the binding material insoluble.

5. The method of making an artificial cork consisting in taking a pulverized base, mixing therewith a binding material and finally hardening said binding material and rendering it insoluble by heat, substantially as described.

6. The method of making artificial cork, consisting in taking granulated cork; mixing therewith a coagulable binding material and finally submitting the composition to a moist heat under pressure to render the binding material insoluble.

7. The method of making artificial cork, consisting in taking granulated cork; mixing therewith albumen and subjecting the composition to such heat as will render the albumen insoluble and retain the natural elasticity and flexibility of the cork; substantially as described.

8. The method of making artificial cork, consisting in taking granulated cork; mixing it with albumen and subjecting the composition to moist heat, substantially as described.

9. The method of making artificial cork, consisting in taking granulated cork; cleansing and purifying the same, adding thereto albumen as a binding material, subjecting the composition to pressure and to a moist heat whereby the albumen is coagulated and becomes insoluble, while the product retains all the elasticity and flexibility of the natural material; substantially as described.

In witness whereof I have hereunto signed my name in the presence of two subscribing witnesses.

JOSÉ SERRA (Y CARBÓ).

Witnesses:
F. L. MIDDLETON,
MALLDIN SUMMERS.